US006782977B1

United States Patent
Mackiewicz

(10) Patent No.: US 6,782,977 B1
(45) Date of Patent: Aug. 31, 2004

(54) DISC BRAKE

(75) Inventor: John Edmund Mackiewicz, Niles, MI (US)

(73) Assignee: Robert Bosch Corporation, Broadview, IL (US)

(*) Notice: Subject to any disclaimer, the term of this patent is extended or adjusted under 35 U.S.C. 154(b) by 0 days.

(21) Appl. No.: 10/605,338

(22) Filed: Sep. 23, 2003

(51) Int. Cl.[7] ............................................. F16D 65/02
(52) U.S. Cl. ................................. 188/73.45; 188/73.39
(58) Field of Search ........................... 188/73.45, 73.44, 188/73.43, 73.39, 73.1, 258 ALL, 73.35–73.38, 205 ALL, 206 ALL, 71.1, 73.31, 72.4, 72.5, 370

(56) References Cited

U.S. PATENT DOCUMENTS

| | | | | |
|---|---|---|---|---|
| 3,035,664 A | * | 5/1962 | Lucien | 188/72.9 |
| 3,625,314 A | * | 12/1971 | Rinker | 188/72.4 |
| 3,924,711 A | * | 12/1975 | Hoffmann et al. | 188/73.43 |
| 4,044,864 A | | 8/1977 | Karasudani | 188/73.3 |
| 4,046,231 A | * | 9/1977 | Ohori et al. | 188/71.1 |
| 4,219,106 A | | 8/1980 | Lupertz et al. | 188/73.6 |
| 4,335,806 A | | 6/1982 | Lupertz | 188/73.39 |
| 4,511,020 A | * | 4/1985 | Williams | 188/73.39 |
| 4,775,036 A | * | 10/1988 | Harrison | 188/250 B |
| 4,823,920 A | * | 4/1989 | Evans | 188/73.34 |
| 5,111,914 A | | 5/1992 | Thiel et al. | 188/73.34 |
| 5,273,137 A | * | 12/1993 | Taig | 188/73.35 |
| 5,551,537 A | | 9/1996 | Mery et al. | 188/73.39 |
| 6,039,155 A | | 3/2000 | Demoise, Jr. | 188/73.39 |

FOREIGN PATENT DOCUMENTS

WO    WO091/13267    *    9/1991

* cited by examiner

Primary Examiner—Douglas C. Butler
(74) Attorney, Agent, or Firm—Leo H McCormick, Jr.; Warren Comstock

(57) ABSTRACT

An anchor having first and second rails to align first and second friction members with a rotor. The first and second friction members are moved into engagement with the rotor to effect a brake application. The anchor has projections that extend from the first and second rails and are aligned with the rotor. The thickness of a friction member is reduced by wear through the engagement with the rotor. Each friction member is attached to a carrier by a first inwardly projecting lip on a first end and a second inwardly projecting lip on a second end that has a length that corresponds to an initial thickness of a friction pad plus one-half the width of a projection. During a brake application the lips either engage projections on the first rail or projections on the second rail such that braking forces are communicated into the anchor without the introduction of a moment that could effect the uniform application of force from the friction member on the rotor.

7 Claims, 2 Drawing Sheets

DISC BRAKE

BACKGROUND OF INVENTION

This invention relates to a disc brake having carrier members associated with first and second friction pads in which reaction forces are carried through point contacts into an anchor along first and second planes that are aligned with the radial surfaces on a rotor during a brake application to substantially eliminate lateral forces that may contribute to non-uniform wear patterns in the first and second friction pads.

Disc brakes such as illustrated in U.S. Pat. Nos. 4,044,864; 4,219,106; 4,335,806 and 5,551,537 have an anchor with support surfaces or rails that are spaced apart from each other to receive and guide first and second friction pads toward a rotor during a brake application. In such disc brakes, the first and second friction pads each have a carrier member that is retained in first and second rails on an anchor. Reaction forces developed during a brake application are communicated from the carriers into the anchor during a brake application. While the shape of the carrier member may be different as illustrated in U.S. Pat. Nos. 5,111,914 and 6,039,155 all such carrier members are off-set with respect to a radial engagement surface of the rotor and as a result a moment is generated by transmission of a friction force into the anchor. Even though this moment is small it contributes to uneven force and the distribution of pressure on the friction pad against the rotor that may create noise and ultimately uneven wear of the friction pad.

SUMMARY OF INVENTION

It is a primary object of this invention to substantially eliminate the introduction of a moment into a carrier member of a friction pad during a brake application by providing for the inline transmission of reaction forces generated during a brake application directly into a support member.

According to this invention, a disc brake has a support member fixed to a housing on a vehicle with first and second rails that align first and second carrier members in parallel planes on opposite sides of a rotor. Friction pads on the first and second carrier members are respectively moved into engagement with first and second radial surfaces on the rotor to develop a brake force that is communicated into the anchor to opposes the rotation of the rotor and thereby effect a brake application. The support member or anchor has first and second projections that extend from the first rail and first and second projections that extend from the second rail. The first projections are located in a first plane that is aligned with the first radial surface of the rotor while the second projections are located in a second plane that is aligned with the second radial surface of the rotor. An initial thickness of the friction pads is continually reduced by wear through the engagement with the rotor during a brake application. Each friction pad is attached to a carrier member and defined by a first inwardly projecting lip on a first end and a second inwardly projecting lip on a second end. The length of each of the first and second inwardly projecting lips is equal to an initial thickness of a friction pads plus one-half the width of a projection that extends from a rail. During a brake application and depending on the rotational direction of the rotor, an inwardly projection lip engages either the first and second projections on the first rail or the first and second projections on the second rail along the first and second planes to transmit braking forces into the anchor without the introduction of a moment that may effect the uniform application of an actuation force between the pad and rotor and ultimately uneven wear of a friction pad.

An advantage of this invention resides in a carrier for first friction member having a inwardly projecting lip that engages a projection that extends from an anchor in a plane that is aligned with a radial rotor surface such that reaction forces are transmitted into an anchor in a same plane as where the reaction force are generated.

A further object of this invention relates to a carrier member for a friction pad wherein an inwardly projecting lip has a length that corresponds to an initial thickness of a friction pad plus at least one-half the width of a projection that extends from a rail on a rotor such that a reaction force is carried through a point contact with the projection with changes in a thickness of the friction pad.

DETAILED DESCRIPTION

In this description a same number may be used for a feature in describing a same component when used in a different locations or it necessary' may be added to the original number.

The disc brake 10 shown in drawings for use in a brake system of a vehicle is basically of a type known in the prior art as disclosed in U.S. Pat. No. 5,810,122.

Figure 1:
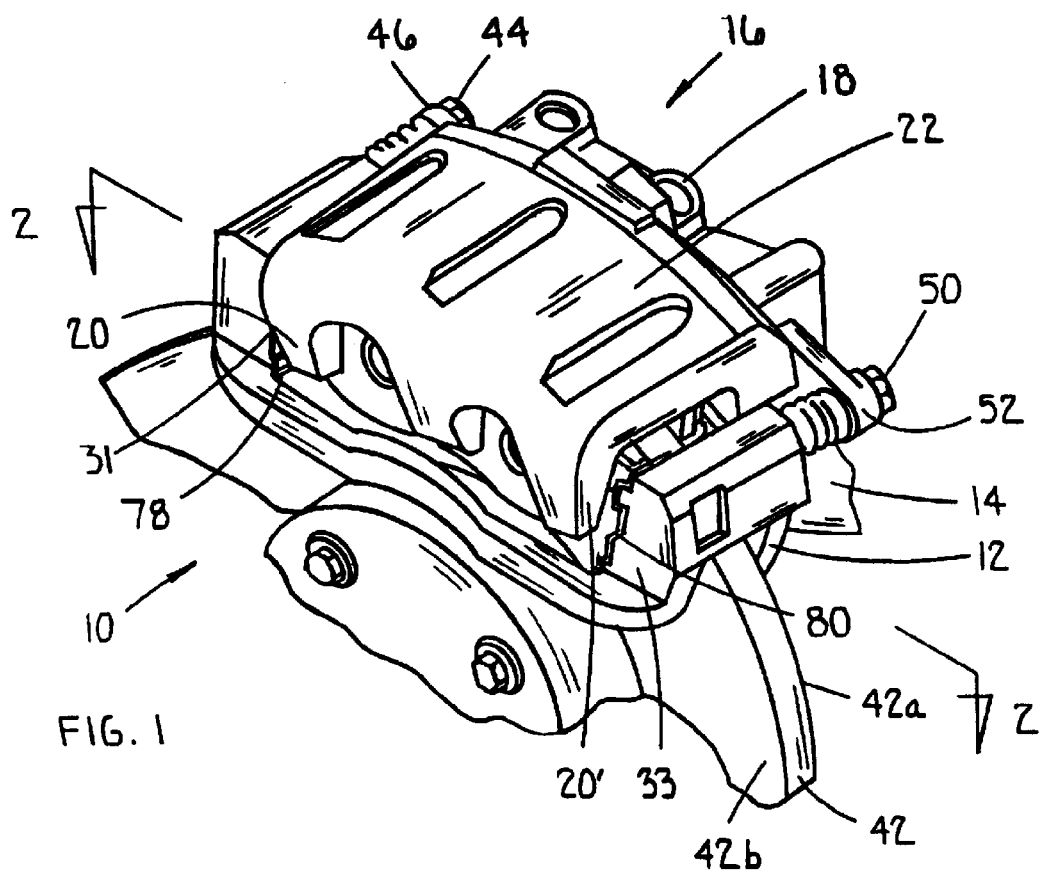
FIG. 1 is a schematic illustration of a disc brake made according to the present invention having support rails in an anchor with projections aligned with first and second radial surface on a rotor through which braking forces are transmitted into the anchor during a brake application.
Figure 2:
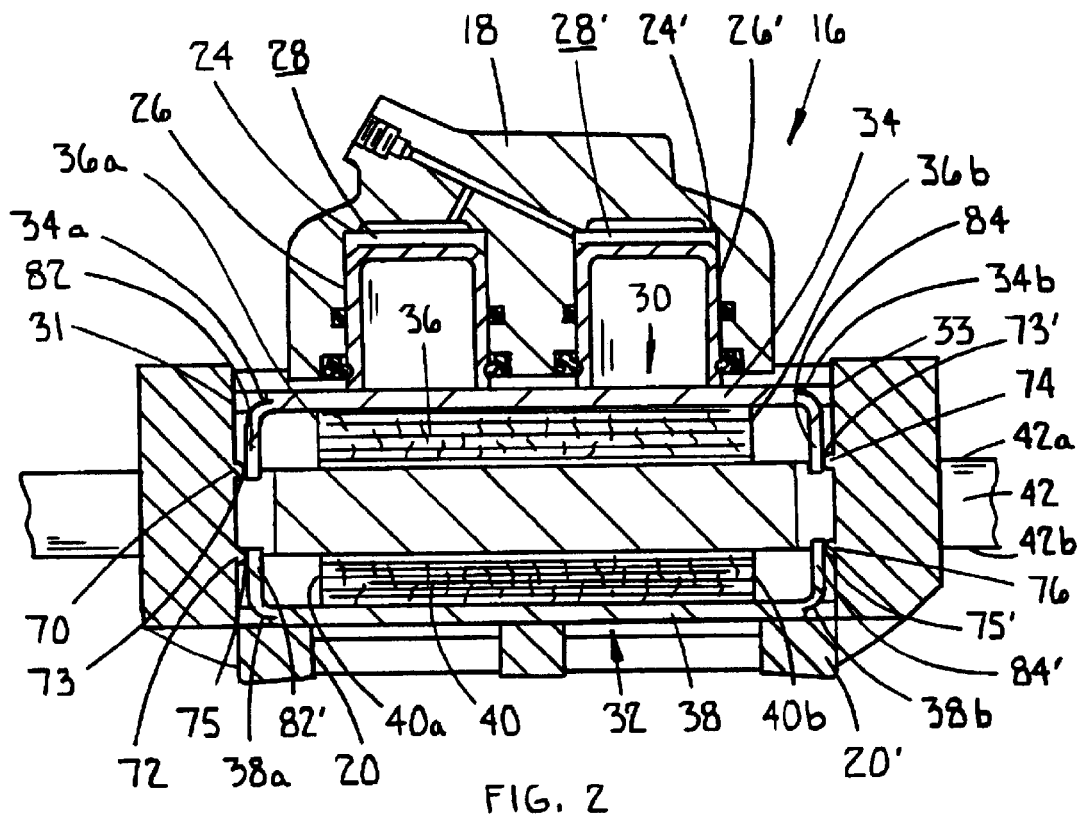
FIG. 2 is a sectional view taken along lines 2—2 of FIG. 1 showing a relationship between the first and second carriers for the first and second friction members and anchor with an initial thickness of the friction pads.

The disc brake 10 as shown in FIG. 1 includes an anchor or support member 12 that is fixed to a stationary frame 14 of a vehicle in a manner as disclosed in U.S. Pat. No. 5,988,761 and an integral caliper 16 is connected to the support member 12 through guide pins 44 and 50. The integral caliper 16 of disc brake 10 includes an actuation section 18 that is connected by a bridge 22 to u-shaped arms 20,20". The actuation section 18 as best illustrated in FIG. 2 has a bore 24,24' therein for the retention of pistons 26,26' to define an actuation chambers 28,28'. A first friction member 30 is associated with pistons 26,26' while a second friction member 32 is associated with arms 20,20'. The first friction member 30 includes a backing plate or carrier 34 and a friction pad 36 while the second friction member 32 also includes a backing plate or carrier 38 and friction pad 40. The backing plate or carrier 34 has a first projection 34a that is located in a slot 31 that defines a first rail of the support member or anchor 12 and a second projection 34b that is located in slot 33 that defines a second rail of the support member 12. Similarly, backing plate or carrier 38 has a first projection 38a that is located in slot 31 of the first rail and a second projection 38b that is located in slot 33 of the second rail of support member or anchor 12. Slots 31 and 33 in support member or anchor 12 are parallel to each other and when the support member or anchor 12 is fixed to a vehicle, the slots 31,33 are positioned in a perpendicular relationship with rotor 42 such that the engagement faces on the first 36 and second 40 friction pads are respectively positioned in parallel planes that are adjacent a first radial face 42a and a second radial face 42b of a rotor 42 that rotates with an axle of the vehicle. The caliper 16 is connected to the support member or anchor 12 by the first guide pin 44 that extends through an opening in an ear 46 that extends from the actuation section 18 and the second guide pin 50 that extends through an ear 52 that extends from the actuation section 18. The first 44 and second 50 guide pins are respectively mounted to slide in corresponding first and second bores in the support member or anchor 12. The first and second bores in support member or anchor 12 are spaced apart and parallel to each other to respectively align the first guide pin 44 and the second guide pin 50 in a parallel relationship with the first slot 31 in the first guide rail and second slot 33 in the second guide rails to assist in maintaining the perpendicular relationship between the radial face 42a on rotor 42 and the face on the first friction member 36 and radial face 42b on rotor 42 and the face on the second friction member 40. During a brake application, the caliper 16 slides with respect to the support member or anchor 12 and the first 44 and second 50 guide pins correspondingly move in the first and second bores in the support member or anchor 12 to maintain the parallel relationship between the friction pads 36 and 40 and corresponding radial surfaces 42a and 42b on rotor 42. Caliper 16 moves with respect to support member or anchor 12 as a reaction to pressurized fluid being supplied to chambers 28,28' that acts pistons 26,26' to move the backing plate or carrier 34 to move friction pads 36 and 40 toward rotor 42. As backing plate or carrier 34 moves, the first projection 34a slides in slot 31 and the second projection 34b slides in slot 33 while at the same time the first projection 38a on backing plate 38 slides in slot 31 and the second projection 38b slides in slot 33. During a brake application, the engagement of the face of friction pad 36 with rotor face 42a and the engagement of the face of friction pad 40 with rotor face 42b create first and second reaction forces that are carried into anchor 12 by way of either the first rail or the second rail (depends on the rotational direction of the rotor) to oppose the rotation of the rotor 42. When the actuation force acting on the pistons 26,26' and arms 20,20' is equal to the brake forces created through the frictional engagement of the friction pads 36 and 40 with radial rotor faces 42a and 42b, the rotor 42 will come to a stop.

The communication of the brake forces into the support member or anchor 12 according to this invention is achieve through the relationship developed between backing plate or carrier 34 and backing plate or carrier 38 and the first slot or rail 31 or the second slot or rail 33 in anchor 12. The physical structure of each backing plate or carrier and the rail of the support member 12 are identical and function in a same manner. In order to eliminated redundancy, only backing plate or carrier 34 and the first rail 31 of support member 12 will hereinafter be described in specific detail unless necessary to further define the operation of the disc brake 10.

Support member or anchor 12 has a first projection 70 and a second projection 72 that extends from the first rail 31 and a first projection 74 and a second projection 76 that extends from the second rail 33. The first projections 70 and 74 have a width "W" with the a center 73,73' thereof located along a first plane that is parallel with the radial face 42a on rotor 42 while the second projections 72 and 76 also have a width "W" with a center 75,75' thereof is located in a second plane that is parallel with the radial face 42b on rotor 42. The anchor is made of a cast member and as a result may not possess a desired resistance to wear when engaged with another member. To protect a rubbed or engaged surface and in particular the guide surfaces of slots 31 and 33, a first surface protection member 78 (made of stainless steel) is located in slot 31 and attached to anchor 12 and a second surface protection member 80 is located in slot 33 and attached to anchor 12. The first and second surface protection members 78 and 80 each have a profile that matches the first and second rails to protect the support member or anchor (cast metal) from frictional wear.

Figure 3:
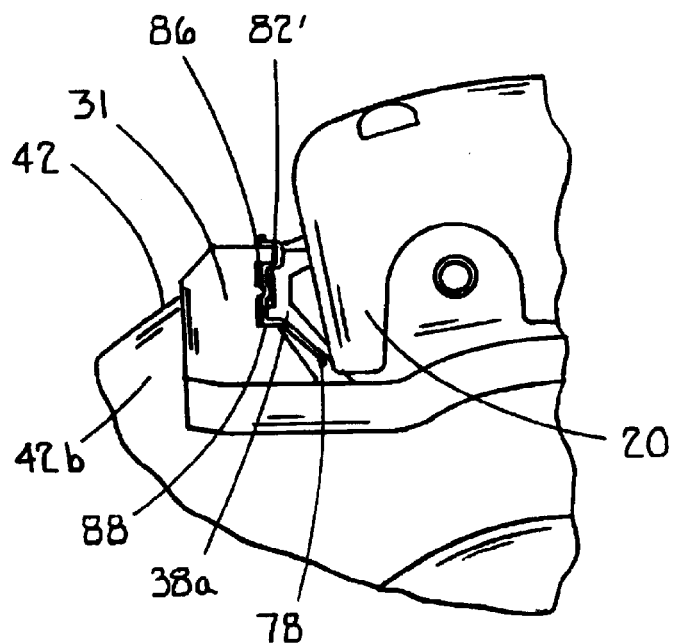
FIG. 3 is a sectional view taken along lines 3—3 showing a relationship between the end of a carrier and rail of the anchor.

The backing plate or carrier 34 is characterized by a flat plate with a first projection 34a defined by an inwardly projection lip 82 and a second projection 34b defined by an inwardly projecting lip 84. Lips 82 and 84 each have a length that is equal to an initial thickness of friction pad 36 plus one-half W of a projection 70. As best illustrated in FIG. 3 for lip 82', each lip 82 has a top 86 and bottom 88 that is located in either slot 31 or slot 33 to provide radial retention and maintain the friction pad 36 in alignment with radial surface 42a.

In disc brake 10, during a brake application, a leading edge (36a and 40a or 36b and 40b) for the friction pads 36 and 40 is defined by the rotation of rotor 42 and is first surface to engage the rotor 42. When 36a and 40a are the leading edges of the friction pads 36 and 40, inwardly projecting lip 82 on backing plate or carrier 34 engages the first projection 70 and inwardly projecting lip 82' on backing plate or carrier 38 engages the second projection 72 on the first rail 31 and when edges 36b and 40b are the leading edge, inwardly projecting lip 84 on backing plate or carrier 34 engages the first projection 74 and inwardly projecting lip 84' engages the second projection 76 on the second rail 33 to transmit frictional engagement forces developed during a brake application into the anchor or support member 12. The actuating pressurized fluid is supplied to chambers 28,28' that act on pistons 26,26' and housing 19 uniformly move the friction members 30 and 42 toward the rotor 42 and on engagement of the face of friction member 36 with rotor face 42a and the face of friction member 40 with rotor face 42b the resulting reaction forces are carried through the point of contact between the inwardly projecting lips on the carrier members 34 and 38 with the projections 70,72,74,76 on the rails along planes that are inline with the plane of frictional engagement. Since the reactions forces are in-line with the frictional engagement forces and directly transmitted into the support member 12 no moment is introduced that effects the uniform application of the actuation force derived from the pressurized fluid. Thus, the actuation force is uniformly applied across an entire carrier member 34,38 to bring the friction pads 36 and 40 into engagement with the rotor 42 in planes that are substantially parallel to the radial faces 42a and 42b of the rotor 42 and as a result the development of noise is substantially reduced or eliminated.

Figure 4:
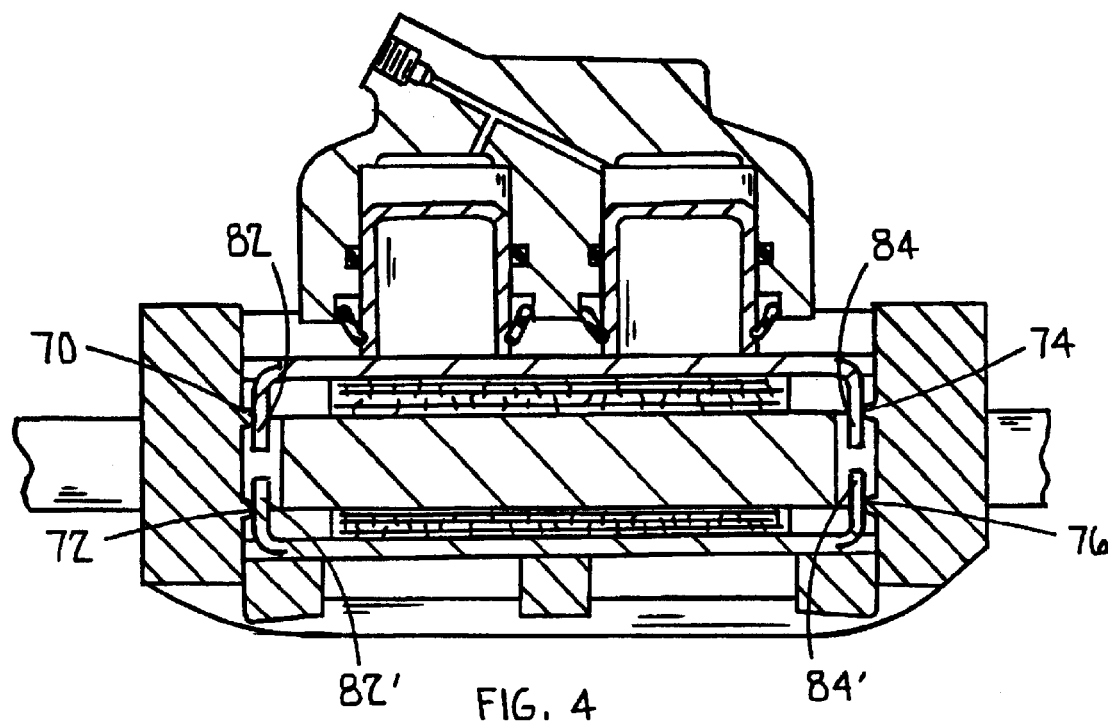
FIG. 4 is a sectional view taken along lines 2—2 of the first and second carriers and anchor after the friction pads have worn through the engagement with the rotor.

Over a period of time, the frictional engagement of friction pads 36 and 40 with radial faces 42a and 42b of rotor 42 cause the thickness of the friction pads 36 and 40 to be reduced in a manner as illustrated in FIG. 4. However, the point contact relationship between the inwardly projecting lips 82,82' and projections 70,72 on the first rail 31 and inwardly projecting lips 84,84' and projections 74,76 on the second rail 33 remain along in planes aligned with the radial surfaces 42a and 42b of rotor 42 and as a result an actuation force is uniformly applied to move the face of friction pads 36 and 40 into engagement with the rotor 42.

What is claimed is:

1. A disc brake having an anchor fixed to a housing, said anchor having first and second rails that align first and second friction members with a rotor, said first friction member having a first friction pad that is moved into engagement with a first radial surface of said rotor and said second friction member having a second friction pad that is moved into engagement with a second radial surface on said rotor to develop first and second brake forces that are carried into said anchor to oppose the rotation of said rotor and effect a brake application, characterized in that said anchor has first and second projections that extend from said first rail and first and second projections that extend from said second rail with said first projections being located in a first plane that is aligned with said first radial surface while said second projections are located in a said second plane that is aligned with said second radial surface; and in that said first and second friction pads have an initial thickness that is continually reduced by wear through the engagement with said rotor; and in that said first and second friction members each have a carrier with a first inwardly projecting lip on a first end and a second inwardly projecting lip on a second end through which a brake force is transmitted into said anchor, said first and second inwardly projecting lips each having a length that corresponds to said initial thickness of said friction pad plus at least one half of the width of a projection such that said lips correspondingly engage said first and second projections on said first rail or said first and second projections on said second rail along first and second planes of engagement during a brake application to communicated said brake forces into said anchor without the introduction of a moment that may effect a uniform application of force between a friction pad and said rotor.

2. The disc brake as recited in claim 1 wherein said engagement of said first and second inwardly projecting lips with said first and second projections on said first and second rails is a point contact along the plane of engagement with the radial face of the rotor even with changes in the thickness of a friction pad.

3. The disc brake as recited in claim 2 wherein said first and second rails provide for radial retention to maintain said first and second friction pads in alignment with said first and second radial surfaces of said rotor.

4. The disc brake as recited in claim 3 as further characterized by a plurality of actuation pistons that engage said first carrier member to assist in maintaining a uniform actuation force to move said first and second friction members toward said rotor.

5. The disc brake as recited in claim 4 as further characterized by a first surface protection member attached to said anchor and matched with said first rail and a second surface protection member attached to said anchor and match with said second rail such that said first and second ends of said friction members engage said protection members lo prevent wear of said rails.

6. The disc brake as recited in claim 5 wherein said first projecting lips on the carriers of said first and second friction members engage said first projections when said rotor is rotating in a first direction and said second projecting lips on the carriers of said first and second friction members engage said second projections when said rotor is rotating in a second direction.

7. The disc brake as recited in claim 4 wherein said uniform actuation force is applied to said carriers and as a result the creation of sound on engagement of said first and second friction pads with said rotor is substantially reduced.

* * * * *